(12) United States Patent
Nazzaro et al.

(10) Patent No.: US 11,106,398 B2
(45) Date of Patent: Aug. 31, 2021

(54) ADDED OUTPUT FUNCTIONS FOR SAVED JOBS ON MULTI-FUNCTION DEVICES

(71) Applicant: Xerox Corporation, Norwalk, CT (US)

(72) Inventors: Cheryl A. Nazzaro, Fairport, NY (US); Sanja Pstrocki-Porras, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/723,006

(22) Filed: Dec. 20, 2019

(65) Prior Publication Data

US 2021/0191665 A1      Jun. 24, 2021

(51) Int. Cl.
*G06F 3/12* (2006.01)

(52) U.S. Cl.
CPC .......... *G06F 3/1203* (2013.01); *G06F 3/1267* (2013.01); *G06F 3/1271* (2013.01)

(58) Field of Classification Search
CPC ............................. G06F 3/1203; G06F 3/1267
See application file for complete search history.

(56) References Cited

U.S. PATENT DOCUMENTS

| 7,216,070 | B2 | 5/2007 | Kitada et al. | |
|---|---|---|---|---|
| 2011/0211212 | A1* | 9/2011 | Berard | H04N 1/00347 358/1.13 |
| 2012/0033241 | A1* | 2/2012 | Park | G06F 40/186 358/1.13 |
| 2015/0193465 | A1* | 7/2015 | Schoeffler | G06F 3/04842 707/827 |

* cited by examiner

*Primary Examiner* — Ibrahim Siddo

(57) ABSTRACT

A method for executing a function on a saved job stored on a multi-function device (MFD) is disclosed. For example, the method is executed by a processor and includes receiving a selection of the saved job stored on the MFD, presenting an option to print and at least one additional output function, receiving a selection of the at least one additional output function, and executing the output function on the saved job.

6 Claims, 5 Drawing Sheets

ADDED OUTPUT FUNCTIONS FOR SAVED JOBS ON MULTI-FUNCTION DEVICES

The present disclosure relates generally to multi-function devices (MFDs) and, more particularly, to adding functions for saved jobs on MFDs.

BACKGROUND

Multi-function devices (MFDs) can be used to perform a variety of different functions. For example, MFDs can be used to copy documents, print documents, fax documents, and the like. Typically, a user may have a computing device that is communicatively coupled to the MFD. The user may create an image to be printed on the computing device and send the image data to the MFD to be printed. In other examples, a document may be scanned by the MFD for printing, copying, faxing, emailing, and the like. However, current MFDs are limited with respect to what can be done with the document once scanned and saved to the MFD.

SUMMARY

According to aspects illustrated herein, there is provided a method, non-transitory computer readable medium, and an apparatus for executing a function on a saved job stored on a multi-function device (MFD). One disclosed feature of the embodiments is a method that receives a selection of the saved job stored on the MFD, presents an option to print and at least one additional output function, receives a selection of the at least one additional output function, and executes the output function on the saved job.

Another disclosed feature of the embodiments is a non-transitory computer-readable medium having stored thereon a plurality of instructions, the plurality of instructions including instructions which, when executed by a processor, cause the processor to perform operations that receive a selection of the saved job stored on the MFD, present an option to print and at least one additional output function, receive a selection of the at least one additional output function, and execute the output function on the saved job.

Another disclosed feature of the embodiments is an apparatus comprising a processor and a computer readable medium storing a plurality of instructions which, when executed by the processor, cause the processor to perform operations that receive a selection of the saved job stored on the MFD, present an option to print and at least one additional output function, receive a selection of the at least one additional output function, and execute the output function on the saved job.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses additional output functions that can be applied to saved jobs on multi-function devices (MFDs). As discussed above, MFDs can be used to perform a variety of different functions. However, MFDs can currently lack some functionality. For example, some documents can be stored in the MFD. However, once stored on the MFD, the number of functions that can be applied to the stored document is limited. For example, the only options available for a document saved to the MFD are print, delete, move, and copy. The move function allows a user to move the stored document to another folder in the memory of the MFD. The copy function allows a user to create another copy of the stored document within the local memory of the MFD. Other than the print function, if the user wants to perform any type of operation that outputs the stored document, the user has to print the document and then perform the additional desired output step.

The present disclosure provides additional output functions that can be applied to documents that are stored locally on the MFD. For example, when a user prints to file or scans a document, the document can be stored in the local memory of the MFD. The user may then select the stored document. In response, a graphical user interface (GUI) may present the user with an option to print and at least one additional output function, as described below. Thus, the embodiments of the present disclosure expand the capabilities of the MFD with respect to stored documents and improve the user experience on the MFD.

Figure 1:
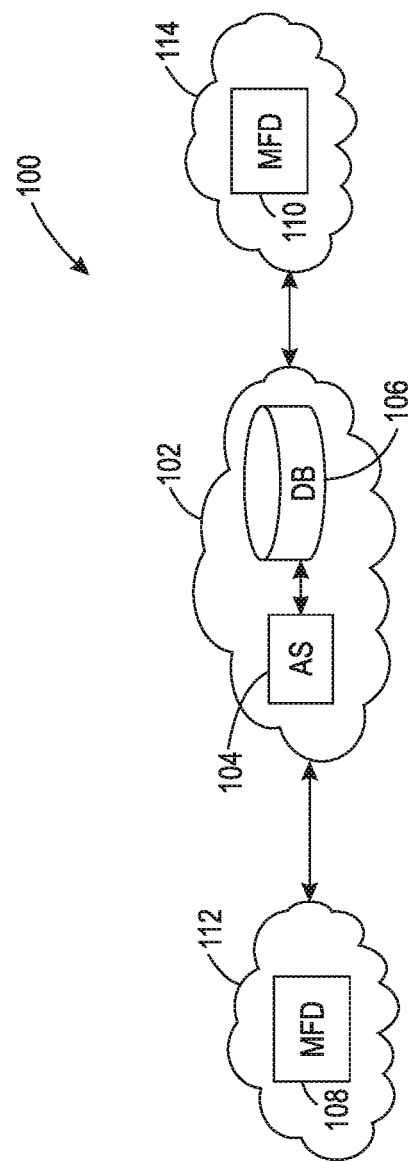
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. Although the AS 104 and the DB 106 are illustrated as separate components, it should be noted that the AS 104 and the DB 106 may be deployed as a single device.

In one embodiment, the communication network 102 may be an Internet protocol (IP) network. The communication network 102 may be wide area network (e.g., across different geographic locations) or a local area network (e.g., a wireless network within a building). In one embodiment, references made to "the cloud" may refer to the communication network 102.

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. In one embodiment, the additional output functionality provided on an MFD 108 (discussed in further details below) may be stored in the AS 104 or the DB 106. When a user logs into the MFD 108 or 110, the AS 104 may distribute the additional output functionality to the MFD 108 or 110.

In one embodiment, the AS 104 and the DB 106 may be part of a printer network. The AS 104 and the DB 106 may store documents that are scanned or saved via a "print to file" operation. The additional output functionality described herein may be applied on documents stored in the "printer network" on the AS 104 and/or the DB 106 that are accessed via the MFD 108 or 110.

In one embodiment, the AS 104 may be communicatively coupled to local networks 112 and 114. The local networks 112 and 114 may be located in different geographic and/or physical locations. For example, the local network 112 may be a local network for an enterprise office in California and the local network 114 may be a local network for an enterprise office in New York. In one embodiment, an MFD 108 may be located in the local network 112 and an MFD 110 may be located in the local network 114.

Although two local networks 112 and 114 are illustrated in FIG. 1, it should be noted that any number of local networks may be communicatively coupled to the communication network 102 and the AS 104. Although a single MFD 108 or 110 is illustrated in the respective local networks 112 and 114, it should be noted that the local networks 112 and 114 may include any number of MFDs.

In one embodiment, the MFD 108 may be referred to as a "local MFD". For example, the MFD 108 may be a local MFD of a user or the MFD that a user interacts with the most. For example, the local network 112 may be where a user works daily.

Figure 2:
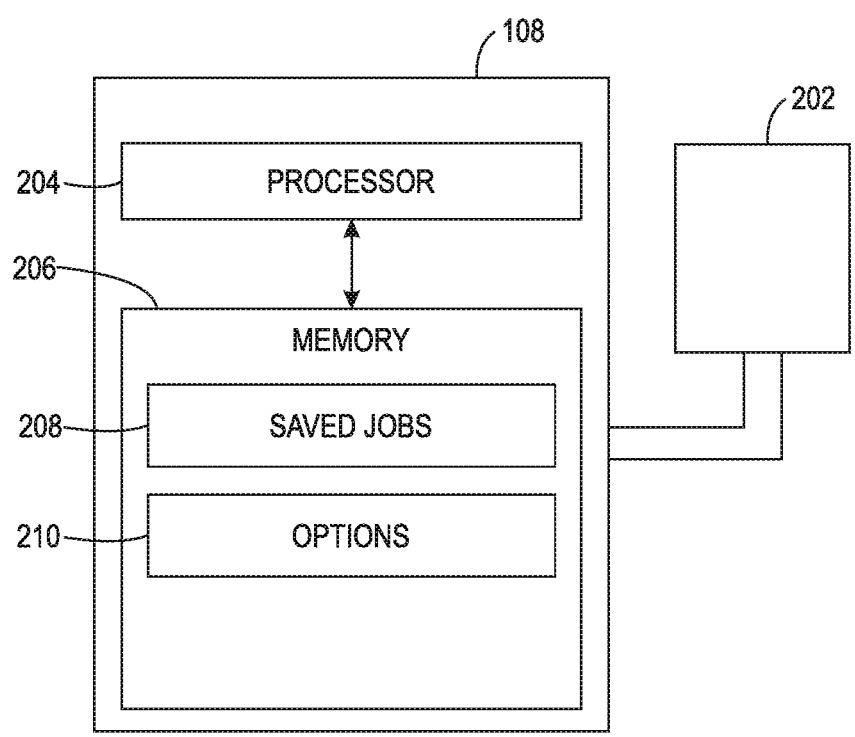
FIG. 2 illustrates a block diagram of an example MFD of the present disclosure.

FIG. 2 illustrates a block diagram of an example MFD 108 of the present disclosure. The MFD 110 may include the same components and be similar to the MFD 108 illustrated in FIG. 1. It should be noted that the MFD 108 has been simplified for ease of explanation and may include additional components that are not shown. For example, the MFD 108 may include a paper tray, a print engine, a digital front end, one or more finishing modules, communication interfaces (wired or wireless), and the like.

In one embodiment, the MFD 108 may include a display 202, processor 204, and a memory 206. The display 202 may provide a graphical user interface (GUI) to allow a user to save documents to the MFD 108, allow the user to find and select saved documents on the MFD 108, provide different output functions for the selected document, and the like, discussed in further details below.

In one embodiment, the processor 204 may be communicatively coupled to the display 202 and the memory 206. The processor 204 may control operation of the display 202. The processor 204 may also execute instructions stored in the memory 206.

In one embodiment, the memory 206 may be any type of non-transitory computer readable medium. For example, the memory 206 may be a hard disk drive, a solid state drive, a read only memory, a random access memory, and the like. In one embodiment, the memory 206 may include saved jobs 208 and options 210.

In one embodiment, the saved jobs 208 may be documents that are stored in the local memory 206 of the MFD 108. For example, a user may place a physical document on the MFD 108 or through a feeder tray of the MFD 108 to scan the physical document. An electronic file of the physical document may be created and stored as a saved job 208. The GUI on the display 202 may allow the user to select a folder or create a new folder to save the electronic file that is created as the saved job 208.

In one embodiment, saved jobs 208 may include electronic files that are created by a "print to file" operation from an endpoint device. For example, from a computing device communicatively coupled to the MFD 108, the user may create an electronic document. Rather than printing the document, the user may "print to file" via the print driver software executed on the computing device. The "print to file" operation may create an electronic file that is stored in the memory 206 of the MFD 108 as a saved job 208.

In one embodiment, the options 210 may include various options or output functions that can be applied to a saved job 208 that is selected. In one embodiment, the options may include output functions such as print and at least one additional output function. As noted above, current MFDs only allow a user to print, delete, move, or copy saved jobs. The present disclosure provides at least one additional output function that can be applied to the saved jobs 208 that are selected from the MFD 108.

In one embodiment, the additional output functions may be a function to generate an output from the saved job or move the saved job to a location outside of the MFD 108. For example, the additional output functions may include an option to email, an option to move the saved job 208 to a cloud storage location, an option to fax the saved job 208, an option to move the saved job 208 to an external storage device that is communicatively coupled to the MFD 108, and the like.

In one embodiment, the option to email may automatically attach the saved job 208 to an email. For example, the user may select a saved job 208. An option to email may be displayed in the GUI in the display 202 of the MFD 108. When the user selects the option to email, the saved job 208 that is selected may be attached to an email that is generated within the GUI of the MFD 108. The user may enter the email address or addresses of the recipient and send the email with the selected saved job 208 as an attachment.

In one embodiment, the option to move the saved job 208 to the cloud storage location may allow a user to move the saved job 208 to a storage location off of the memory 206 of the MFD 108. For example, the user may select the saved job 208 via the GUI of the MFD 108. In response, the GUI may provide an option to save to the cloud. The user may select the option to save to the cloud and be prompted to enter a web address of a desired cloud storage location. In one example, the option to save to the cloud may automatically open a web browser where the user can go to a desired cloud storage location. The user may then log into the cloud storage account, and MFD 108 may upload the saved job 208 that is selected into the user's cloud storage location/account.

In one embodiment, the saved job 208 may be moved from the MFD 108. In other words, the copy of the saved job 208 may be deleted from the memory 206 when moved to the user's cloud storage location. In one embodiment, a copy of the saved job 208 may be generated and moved to the user's cloud storage location. A copy of the saved job 208 may remain in the memory 206 of the MFD 108.

In one embodiment, an option to fax the saved job 208 may allow a user to fax the saved job 208 that is selected to a desired fax number. For example, the previous MFDs would require the user to print the document, then rescan the document with a fax function on the MFD. In contrast, the present disclosure allows a user to simply select an option to fax from the GUI when a saved job 208 is selected.

In one embodiment, the option to move the saved job 208 to an external storage device may allow the user to save a copy of the saved job 208 to an external storage device. For example, the user may connect a universal serial bus (USB) storage device or an external hard disk drive to a USB interface of the MFD 108. The user may navigate through a file directory via the GUI of the MFD 108 to select one or more saved jobs 208. When selected, the GUI may display an option to move to external storage device. When the user selects the option to move to external storage device, the MFD 108 may search the USB interfaces for connected storage devices. The GUI may then display the connected external storage devices. The user may select the connected external storage device and the MFD 108 may move the saved job 208 to the connected external storage device. In one embodiment, the saved job 208 may be deleted from the memory 206 or a copy may be kept on the memory 206.

Thus, the MFD 108 of the present disclosure may provide additional output functions, other than print, delete, move, and copy, that can be applied to the saved jobs 208. Providing the additional output functions may expand the way saved jobs 208 can be used and/or improve the efficiency of how the output functions can be applied to the saved jobs 208.

Moreover, the additional output functions are provided in response to selection of a saved job stored in the local memory 206 of the MFD 108. In other words, the present disclosure is related to MFDs and not general computing devices. The MFD 108 is a device that can print, copy, fax, and scan documents or media.

Furthermore, the additional output functions of the present disclosure are not provided on a home screen of the MFD where a user may initiate a job when a document is placed initially in the MFD. Rather, the additional output functions of the present disclosure are presented in response to a selection of a saved job 208 stored in the memory 206 of the MFD 108. In other words, additional output functions of the present disclosure may be presented from within a file directory after a file that is stored in the memory 206 of the MFD 108 is selected.

Figure 3:
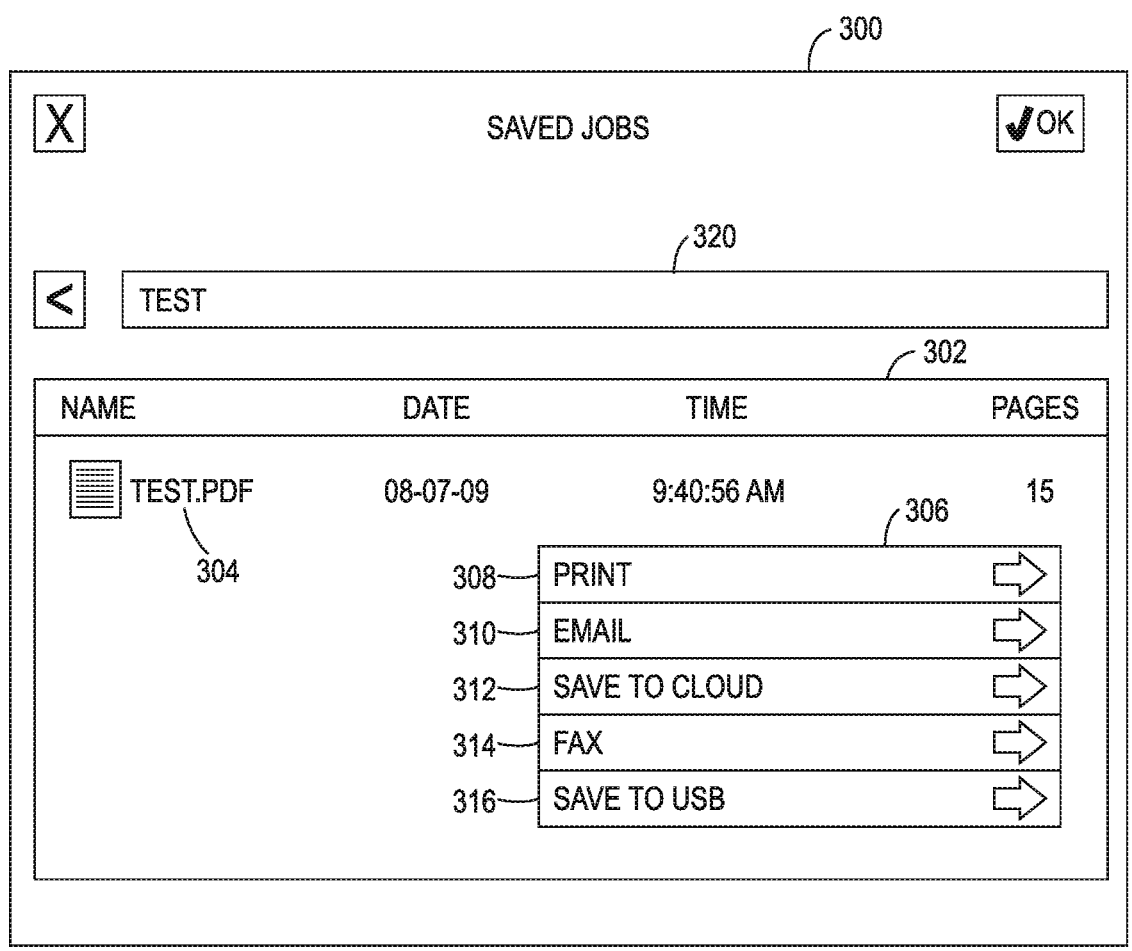
FIG. 3 illustrates an example of a screenshot for a GUI to present additional output functions for saved jobs on an MFD of the present disclosure.

FIG. 3 illustrates an example of a GUI 300 that may be shown in the display 202. The GUI 300 may present the options 210 that include the additional output functions after a user has selected a saved job 208. FIG. 3 illustrates an example where a file 304 has been saved (e.g., a saved job 208) in the local memory 206 of the MFD 108.

In one embodiment, the GUI 300 may provide a window 302 that displays the file 304 or files 304 that have been saved to the memory 206 of the MFD 108. In one embodiment, the file 304 may be stored in the printer network on the AS 104 and/or DB 106, as described above. However, the file 304 is accessed via the GUI 300 of the MFD 108. The file 304 may be saved from scanning a physical document on the MFD 108 or may be saved from a "print to file" operation that is executed on an endpoint device that is communicatively coupled to the MFD 108.

The GUI 300 may also include a window 320 that provides a name of the folder that the user has selected. For example, the user may select a folder from a file directory. In response, the window 302 may be presented and the name of the folder may be shown in the window 320.

In one embodiment, a user may select the saved file 304. In response, a window of options 306 may be presented to the user in the GUI 300. The window of options 306 may include all of the options 210. As noted above, the window of options 306 may include an option to print 308 and at least one additional output function 310, 312, 314, and 316. In one embodiment, the additional output functions may include an option to email 310, an option to save to the cloud 312, an option to fax 314, and an option to save to a USB (or external storage device) 316. The user may select one of the options 308-316 and the option may be executed on the saved file 304.

It should be noted that the options 308-316 are provided from a window 302 that displays saved files 304. In other words, the options 308-316 of the present disclosure are not accessed from a home screen of the MFD 108.

Figure 4:
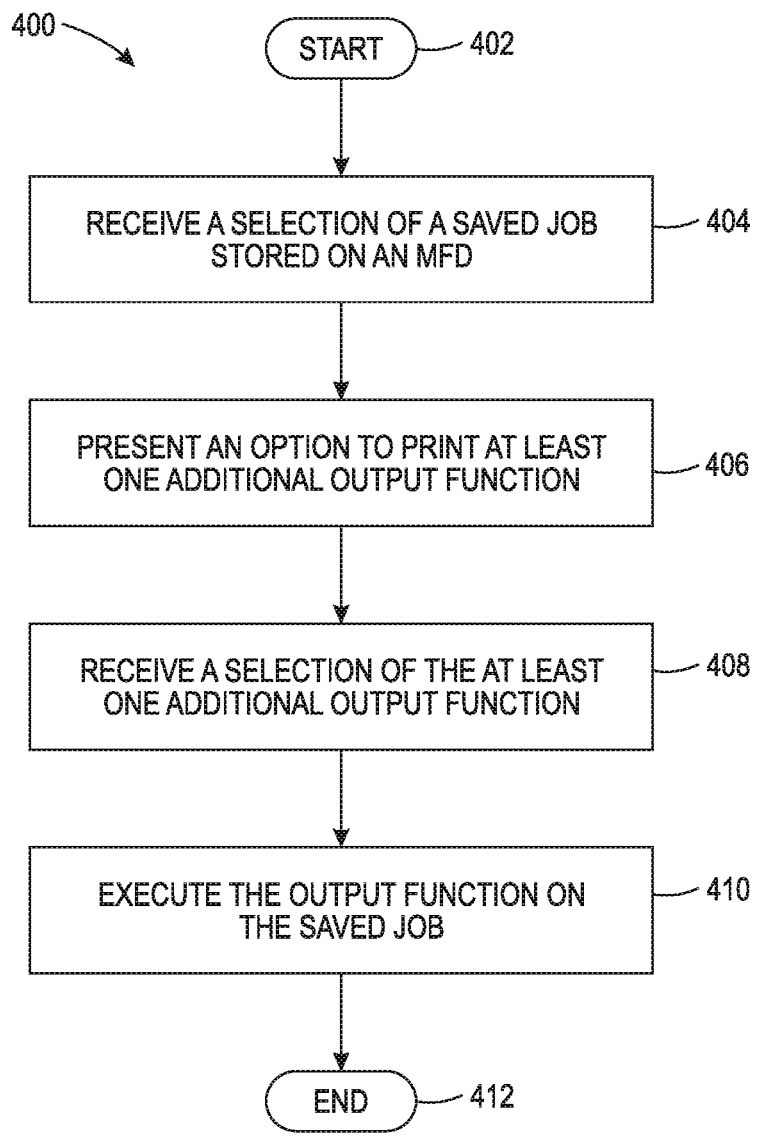
FIG. 4 illustrates a flowchart of an example method for executing a function on a saved job stored on an MFD of the present disclosure.
Figure 5:
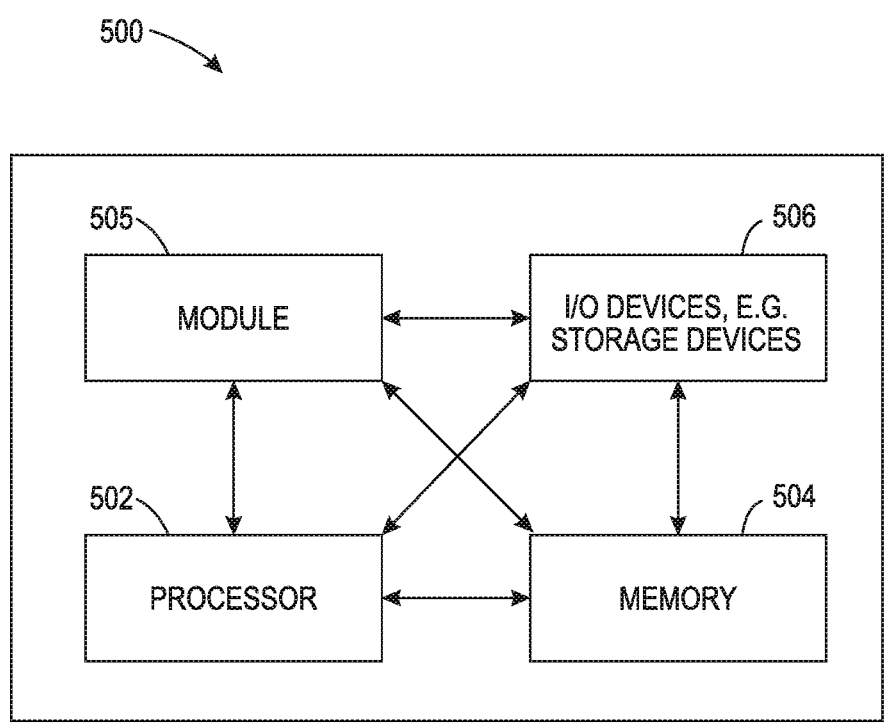
FIG. 5 illustrates a high-level block diagram of an example computer suitable for use in performing the functions described herein.

FIG. 4 illustrates a flowchart of an example method 400 for executing a function on a saved job stored on an MFD of the present disclosure. In one embodiment, one or more blocks of the method 400 may be performed by the MFD 108, or a computer/processor that controls operation of an MFD as illustrated in FIG. 5 and discussed below.

At block 402, the method 400 begins. At block 404, the method 400 receives a selection of the saved job stored on the MFD. In one embodiment, the saved job may be an electronic file that is generated from a document on the MFD or from an electronic file generated by a print to file operation executed on an endpoint device. For example, the endpoint device may be communicatively coupled to the MFD and may execute print driver software that can print to file to save an electronic file on the MFD.

In one embodiment, the saved job may be presented in a GUI shown on a local display of the MFD. For example, the user may navigate the GUI through a file directory to open a folder that includes the saved job. From the GUI, the user may select or highlight the saved job.

At block 406, the method 400 presents an option to print and at least one additional output function. In one embodiment, in response to the selection of the saved job, the GUI may present the option to print and at least one additional output function. The additional output function may be a function that generates an output from the saved job or moves the saved job to a location outside of the MFD. For example, functions such as delete, move, or copy that are currently available do not generate an output or move the saved job outside of the MFD.

In one embodiment, the additional output functions may include an option to email the saved job as an attachment, an option to move the saved job to a cloud storage, an option to fax the saved job, an option to move the saved job to an external storage device communicatively coupled to the MFD, and the like. In one embodiment, all of the additional output functions may be presented. In one embodiment, any combination of the additional output functions may be presented in addition to the option to print.

At block 408, the method 400 receives a selection of the at least one additional output function. For example, the option to email the saved job as an attachment, the option to move the saved job to a cloud storage, the option to fax the saved job, or the option to move the saved job to an external storage device communicatively coupled to the MFD may be selected.

At block 410, the method 400 executes the output function on the saved job. For example, if the option to email the saved job is selected, the saved job may be attached to an email that is generated by the MFD. The GUI of the MFD may open an email window with the attached saved job and the user may enter an email address and text to send the email.

If the option to move the saved job to a cloud storage is selected, the GUI may open a web browser to allow the user to navigate to the cloud storage service provider of the user. The user may then log into the user's account and the MFD may then upload the saved job to the cloud storage. In one embodiment, the user may be presented with a field to enter the address of the cloud storage.

If the option to fax the saved job is selected, the GUI may present a field to the user to enter a fax number. The user may enter the fax number and the MFD may fax the saved job to the fax number.

If the option to move the saved job to an external storage device communicatively coupled to the MFD is selected, the MFD may scan interfaces to search for a connected storage device. For example, the MFD may scan the USB interfaces to see if an external storage device is connected. If an external storage device is found, the MFD may present an option to select the connected external storage device in the GUI. The user may select the connected external storage device, and the MFD may upload, copy, or move the saved job the connected external storage device.

Notably, the selection of the additional output function may be performed from a window where saved files are displayed and/or selected. In other words, the selection of the additional output function is not performed from a home screen of the MFD. In addition, the additional output function is presented and selected from an MFD and not a general computing device. Thus, the functionality of the MFD is improved. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for executing a function on a saved job stored on an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for executing a function on a saved job stored on an MFD (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for executing a function on a saved job stored on an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for executing a function on a saved job stored on a multi-function device (MFD), comprising:

receiving, by a processor of the MFD, a selection of the saved job stored on the MFD, wherein the saved job is a physical document that is scanned on the MFD or an electronic file that is stored as a print to file operation;

presenting, by the processor, an option to print, an option to attach the saved job to an email that is generated by the MFD within a graphical user interface (GUI) of the MFD, an option to save the saved job to a cloud storage location that is to open a web browser in the GUI of the MFD to access the cloud storage location, an option to fax the saved job, and an option to move the saved job to an external storage device that causes the MFD to scan universal serial bus (USB) interfaces for the external storage device that is connected and causes the MFD to display the external storage device that is connected in the GUI of the MFD in response to the selection of the saved job from a file directory presented on a graphical user interface of the MFD;

receiving, by the processor, a selection of the option to attach the saved job to an email, the option to save the saved job to a cloud storage location, the option to fax the saved job, or the option to move the saved job to an external storage device; and executing, by the processor, the option that is selected on the saved job.

2. The method of claim 1, wherein the print to file operation is executed by a print driver on an endpoint device communicatively coupled to the MFD.

3. The method of claim 1, wherein the graphical user interface is shown on a local display of the MFD.

4. A non-transitory computer-readable medium storing a plurality of instructions, which when executed by a processor of a multi-function device (MFD), cause the processor to perform operations for executing a function on a saved job stored on the MFD, the operations comprising:

receiving a selection of the saved job stored on the MFD, wherein the saved job is a physical document that is scanned on the MFD or an electronic file that is stored as a print to file operation;

presenting an option to print, an option to attach the saved job to an email that is generated by the MFD within a graphical user interface (GUI) of the MFD, an option to save the saved job to a cloud storage location that is to open a web browser in the GUI of the MFD to access the cloud storage location, an option to fax the saved job, and an option to move the saved job to an external storage device that causes the MFD to scan universal serial bus (USB) interfaces for the external storage device that is connected and causes the MFD to display the external storage device that is connected in the GUI of the MFD in response to the selection of the saved job from a file directory presented on a graphical user interface of the MFD;

receiving a selection of the option to attach the saved job to an email, the option to save the saved job to a cloud storage location, the option to fax the saved job, or the option to move the saved job to an external storage device; and executing the option that is selected on the saved job.

5. The non-transitory computer-readable medium of claim 4, wherein the print to file operation is executed by a print driver on an endpoint device communicatively coupled to the MFD.

6. The non-transitory computer-readable medium of claim 4, wherein the graphical user interface is shown on a local display of the MFD.

\* \* \* \* \*